May 8, 1951  J. C. AUTEN  2,551,718
STOKER OVERLOAD SAFETY CLUTCH
Filed May 10, 1946
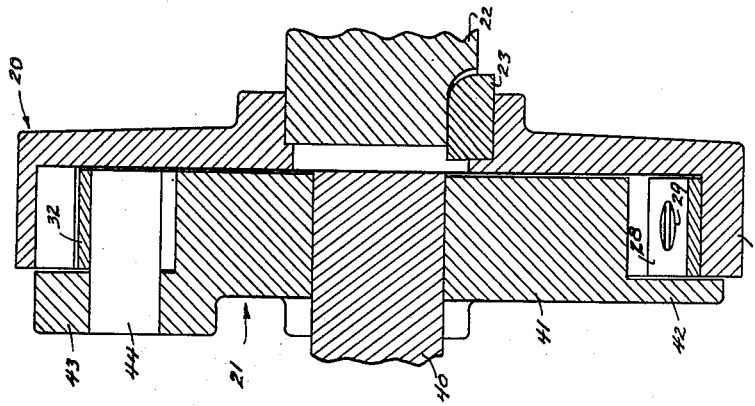
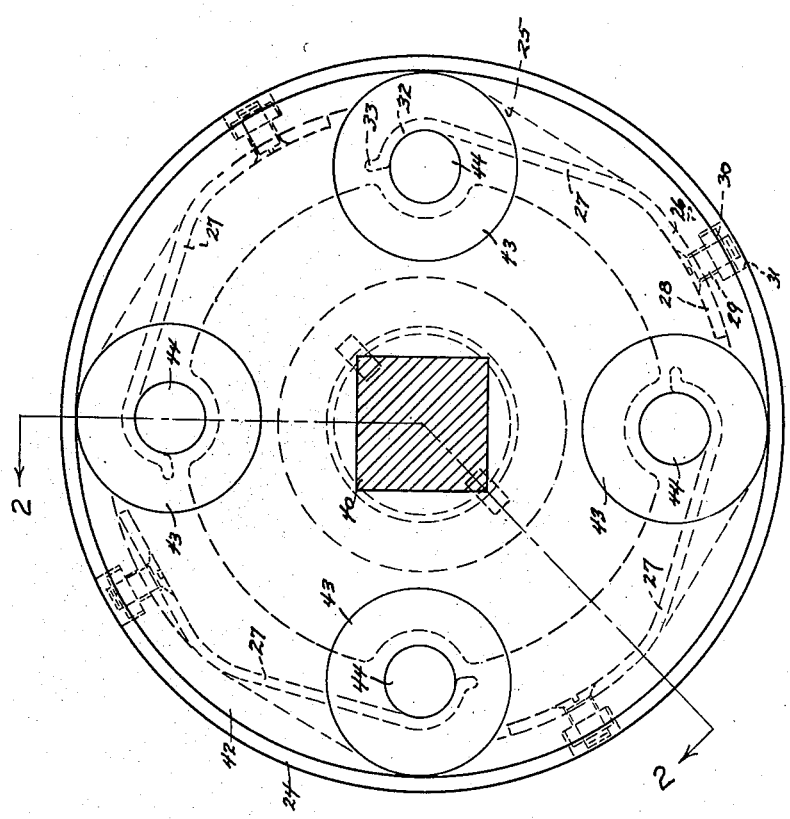
INVENTOR.
JAY C. AUTEN
BY
Harness & Harris
Attorneys Patented May 8, 1951

2,551,718

UNITED STATES PATENT OFFICE 2,551,718

STOKER OVERLOAD SAFETY CLUTCH

Jay C. Auten, Royal Oak, Mich., assignor to Chrysler Corporation, Highland Park, Mich., a corporation of Delaware Application May 10, 1946, Serial No. 668,855

1 Claim. (Cl. 64—29)

The object of the present invention is to provide a safety clutch between the prime mover and the working mechanism of a coal stoker or the like. A coal stoker comprises a feeding mechanism such as a ram or screw which intermittently or continuously feeds coal into the burning retort. It quite often happens that some foreign substances such as rocks, bolts or other metal objects and pieces of wood are introduced into the coal bin from which the feeding member receives its supply. In the usual stoker mechanism such an object, if large enough, will jam the feeding mechanism and cause the motor to burn, or would cause failure of other parts, if it were not for the provision of some safety device between the prime mover and the feeding mechanism. An object of the present invention is to provide a durable clutch which will permit transmission of normal driving torque to the feed screw or the like but will yield when the feed screw encounters an overloading resistance to movement.

An object of the present invention is to provide such a clutch with durable qualities so as to have long life regardless of hard usage.

In the use of stokers it is not desired that stoppage of the stoker should exist for long periods of time since the fire would become extinguished. Hence, an alarm device is usually provided to announce the stopping of feeding action immediately upon its occurrence. Such a device usually comprises a source of current, an electromagnetic bell, and a switch which completes the circuit to the bell upon stoppage of the feeding mechanism. Such devices are expensive and subject to the usual causes of failure. It is an object of my invention to provide an alarm device in the slip clutch itself, such device being of a character to produce a loud noise similar to that of a ratchet mechanism which will continue as long as the clutch slips. The operator or householder will thus be warned to remove the obstruction immediately upon its becoming effective to stop the feeding of fuel.

The foregoing and other objects and advantages of the present invention will be apparent from a study of the following specification taken in connection with the accompanying drawings wherein like numerals refer to like parts throughout. In the drawings Fig. 1 discloses an end view of a preferred form of my invention and Fig. 2 is a section taken substantially along line 2—2 of Fig. 1.

The clutch comprises a drive member 20 and a driven member 21, the driving member 20 being connected to a driving shaft 22 through keys 23, the shaft being driven by any suitable source of power (not shown). The driving member 20 comprises a disk having a flange 24 projecting normally to the plane of the disk and concentric therewith. The flange is provided with recessed portions 25 and intermediate thick portions 26. A plurality of leaf spring 27 are mounted upon the flange so as to extend around the inner face thereof in substantially end to end relationship. Each spring is provided with a seating portion 28 adapted to be drawn taut against the inner surface of the flange by a screw 29 extending through the flange and engaging a nut 30 held within an outer recess 31. The free end of the spring has an inwardly curved hook portion 32 terminating in a lateral extension 33. As seen in the upper left quadrant of Fig. 1 the seating portion 28 is normally straight and the screw in drawing this portion down to conform with the curvature of the flange tensions the free end inwardly.

The driven member 21 is connected to the feed screw or the like which may have an end 40 of square cross section to engage a centrally located square opening in the member. The driven member comprises a centrally located thick disk 41 having a laterally extending flange 42. The outer face of the thick portion 41 is of less diameter than the minimum diameter of the flange 24 so that an annular space is provided within which the springs 27 are located and retained in alignment by the flange 42. The flange 42 is provided with a plurality of bosses 43 within which are mounted pins 44 extending into the annular space parallel to the axis of the clutch. The radius of each pin is preferably equal to the radius of curvature of the inner face of the hook portions 32, and the location of the pins is such that the hooked portions normally engage the pins to transmit driving torque when the driven member is rotated clockwise as viewed in Fig. 1. If the feed screw is prevented from turning the free ends of the springs will be forced outwardly into the recesses 25 until the lateral extensions 33 clear the pins 44. At this point the tensioning of the springs will cause the extensions 33 to be struck against the body of the driven member with considerable force, thus creating a warning noise. As long as the driving member rotates, there will be a succession of loud noises sounding like a ratchet mechanism.

It is to be appreciated that various forms of engaging devices may be utilized, it being my intention to claim the use of any such engaging device having a resilient element or elements of sufficient strength to transmit normal driving torque but being yieldable when a predetermined resistance to rotation is encountered, and having sufficient tension to strike a forceful blow against a portion of the clutch whereby to sound a succession of alarm noises. It should also be apparent that one such engaging and yieldable member may be sufficient, or two or more may be used, but I prefer the use of four in the type of construction illustrated. The clutch may be prepacked with heavy grease and provided with grease retaining rings of any usual type.

Having illustrated and described a preferred embodiment of my invention I claim all such modifications in arrangement and detail thereof as come within the scope of the following claim.

I claim:

A slip clutch for a stoker feed screw or the like comprising a driving member adapted to rotate about an axis, a driven member adapted to rotate about said axis, and yieldable means normally establishing driving engagement of said members, said yieldable means comprising a plurality of leaf spring elements each having a hooked end portion and a fixed end attached to one of said members, and a plurality of pins carried by the other of said members and extending in a direction parallel to said axis, each of said pins having a diameter substantially equal to the internal diameter of one of said hooked end portions and being received therein, said leaf spring elements having sufficient strength to transmit normal driving torque but being yieldable to release said pins when a predetermined resistance to rotation is exerted against said driven member, the member carrying said pins having surfaces spaced inwardly of and extending between said pins whereby the leaf spring elements drop down on to said surfaces when released from said pins to create warning sounds as an incident to the release of said pins.

JAY C. AUTEN.

REFERENCES CITED

The following references are of record in the file of this patent:

UNITED STATES PATENTS

| Number | Name | Date |
| --- | --- | --- |
| 1,290,507 | Carroll | Jan. 7, 1919 |

FOREIGN PATENTS

| Number | Country | Date |
| --- | --- | --- |
| 200,759 | Great Britain | of 1923 |